United States Patent [19]

Oetiker

[11] 4,103,399
[45] Aug. 1, 1978

[54] HOSE CLAMP

[76] Inventor: Hans Oetiker, 21 Oberdorfstrasse, Horgen, Switzerland

[21] Appl. No.: 773,653

[22] Filed: Mar. 2, 1977

[51] Int. Cl.² .......................................... B65D 63/06
[52] U.S. Cl. .................................... 24/22; 24/23 R; 24/262; 285/252
[58] Field of Search ................... 24/19, 20 R, 20 CW, 24/20 S, 20 LS, 20 TT, 21, 22 I, 23 R, 262 R; 285/252; 138/99

[56] References Cited

U.S. PATENT DOCUMENTS

| 3,303,669 | 2/1967 | Oetiker | 24/20 R X |
| 3,460,788 | 8/1969 | Goldman | 24/262 R |
| 3,475,793 | 11/1969 | Oetiker | 24/20 CW |
| 3,510,918 | 5/1970 | Oetiker | 24/19 |
| 3,789,463 | 2/1974 | Oetiker | 24/20 CW |
| 3,869,944 | 3/1975 | Oetiker | 24/20 CW X |

FOREIGN PATENT DOCUMENTS

| 63,911 | 8/1892 | Fed. Rep. of Germany | 138/99 |
| 323,127 | 12/1929 | United Kingdom | 24/20 CW |

Primary Examiner—Werner H. Schroeder
Assistant Examiner—Moshe I. Cohen
Attorney, Agent, or Firm—Craig & Antonelli

[57] ABSTRACT

A hose clamp with a deformable ear of approximately U shape which upon deformation contracts the clamp to fix the hose onto a nipple; to preclude any non-tightness in the clamp within the area of the gap of the band underneath the ear, the ear is provided with an elastic insert that is displaced into the gap to prevent any outward displacement of the hose into the gap.

24 Claims, 11 Drawing Figures

HOSE CLAMP

The present invention relates to a hose clamp to fasten, for example, a hose onto a nipple.

Hose clamps, as described in my prior U.S. Pat. Nos. 2,614,304 (two-ear clamp), 2,847,742 (band-clamp) and 3,082,498 (one-ear clamp) have proved highly successful in numerous applications and have enjoyed great commercial success. However, particularly when used with thin plastic hoses, problems arise at times in achieving a sufficient clamping action over the entire circumference of the hose to hold the same tightly clamped onto the nipple at every location along its entire circumference due to the fact that during the contraction of the clamp, the hose may be squeezed outwardly into the gap underneath the ear, i.e., into the gap formed between the ends of the band where the band passes over into the ear.

Numerous attempts have been made heretofore to solve this problem. For example, in my prior U.S. Pat. No. 3,286,314, a hose clamp is disclosed in which one free end of the band overlaps the ear, formed near the other, outer end of the band. However, in particular, with thin hoses, this arrangement may be disadvantageous because the thin walls of the hose may be damaged and eventually rendered defective due to wear at the edge of the free end of the overlap. Furthermore, this arrangement results in relatively high costs due to the extra quantity of band material required to achieve the overlap.

To remedy this drawback, a bridging member is disclosed in my prior U.S. Pat. No. 3,789,463 in which the opening or gap in the circumferential band of the clamp within the area of the ear is effectively closed by the bridging member affixed to the band on both sides of the gap. Additionally, an insert ring is disclosed in my prior U.S. Pat. No. 3,303,669 for the same purpose which effectively bridges and therewith closes the circumferential gap in the band of the clamp within the area of the ear. Finally, special pincers have been developed by me which prevent the rubber or plastic material of the hose from entering into the gap underneath the ear in order to prevent any leakage thereat. Even though these specially constructed pincers find frequent use, they are not suited in all applications. More specifically, numerous situations exist where the insert rings according to U.S. Pat. No. 3,303,669 or the bridging member according to U.S. Pat. No. 3,789,463 were required heretofore in lieu of the pincers in order that soft rubber hoses and especially thin plastic hoses were sealed tightly onto the nipple. An absolutely tight seal is also a prerequisite for the band clamps as described in my prior U.S. Pat. No. 2,847,742, which becomes the more difficult the softer the rubber or the thinner the plastic material. Moreover, the smaller the diameter of the hose, the more problematical becomes the use of bridging members or inserts.

Furthermore, inserts (U.S. Pat. No. 3,303,669) and bridging members (U.S. Pat. No. 3,789,463) not only involve additional expenditures due to the extra material and manufacturing costs thereof, but further increase the overall cost of the clamp due to the required installation of the inserts or bridging members into the clamp which normally has to be done manually.

The present invention is concerned with the task to eliminate the aforementioned drawbacks and shortcomings of the prior art and to provide a hose clamp which assures a tight sealing action over the entire clamp circumference even with soft rubber hoses or thin plastic hoses without the need for inserts, bridging members, overlapping ends or special pincers.

The underlying problems are solved according to the present invention in that an elastic insert of rubber or rubber-like material is provided in the ear of the clamp. Tests have demonstrated that a completely reliable, absolutely satisfactory tightening of the band is assured therewith under all circumstances over the entire circumference of the hose clamp, i.e., also within the area of the gap, which permits the realization of a completely satisfactory tightening of the hose onto the nipple from the smallest to the largest diameter of the hose, regardless of type of hose material, the thickness of such material or the softness of such material.

The elastic inserts may be affixed in the ears of the clamp by any conventional means, such as by the use of suitable adhesive. In a preferred embodiment, the elastic inserts may be vulcanized in situ into the ears of the clamps.

Furthermore, the use of the circumferential groove, as disclosed in my prior U.S. Pat. No. 3,475,793, assumes new importance since it entails the advantage of a greatly strengthened ear during the deformation, capable of withstanding any opening tendency that may result from the presence of the rubber insert in the ear.

Accordingly, it is an object of the present invention to provide a hose clamp which avoids by simple means the aforementioned shortcomings and drawbacks encountered in the prior art.

Another object of the present invention resides in a hose clamp which obviates the need for special inserts or bridging members or the use of special tools to prevent the hose material from being forced into the gap formed in the band within the area underneath the ear.

A further object of the present invention resides in a hose clamp which assures under all conditions a completely tight seal, irrespective of the type, thickness and/or softness of the material of the hose.

A still further object of the present invention resides in a hose clamp which is simple in construction, yet is hightly effective to assure a reliable seal of the hose under all circumstances.

Another object of the present invention resides in a hose clamp which not only achieves all of the aforementioned objects and aims by simple inexpensive means but additionally lends itself readily to relatively inexpensive mass production techniques, thereby avoiding any significant increases in the cost of the clamps.

These and other objects, features and advantages of the present invention will become more apparent from the following description when taken in connection with the accompanying drawing which shows, for purposes of illustration only, several embodiments in accordance with the present invention, and wherein.

Figure 1:
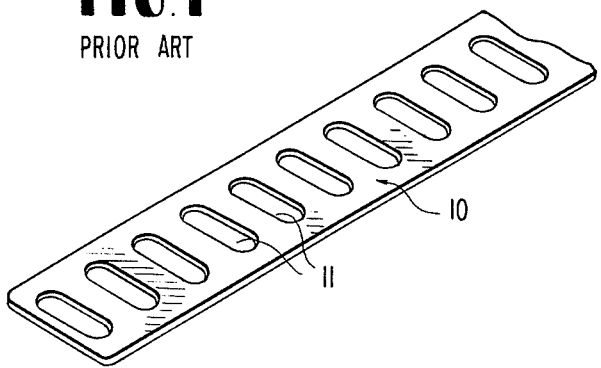
FIG. 1 is a perspective view of a perforated metal band forming part of a prior art hose clamp.
Figure 2:
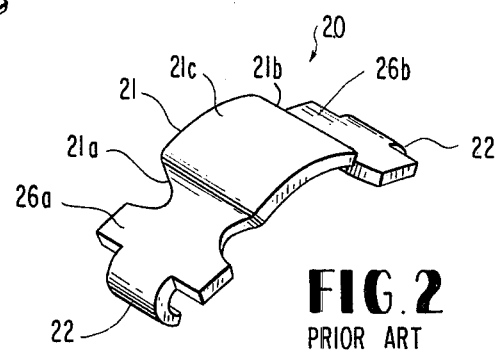
FIG. 2 is a perspective view of the clamping member for use with the metal band of FIG. 1.

Referring now to the drawing wherein like reference numerals are used throughout the various views to designate like parts, FIGS. 1 and 2 illustrate a so-called band clamp as disclosed in my prior U.S. Pat. No. 2,847,742 in which a metal strip or band generally designated by reference numeral 10 and provided with equally spaced perforations 11 is cut at the desired length from the reel (FIG. 1). The clamping band 10 thus cut is then placed about the hose 30 (FIG. 3) mounted over a nipple 40, and the free ends of the band 10 are then interconnected by a clamping member generally designated by reference numeral 20 (FIGS. 2 and 3) which is provided with an approximately U-shaped ear 21 formed by two outwardly extending portions 21a and 21b interconnected by a web portion 21c and with circumferential portions 26a and 26b terminating in hook-like end portions 22 adapted to engage in corresponding perforations 11 of the free ends of the band 10.

Figure 3:
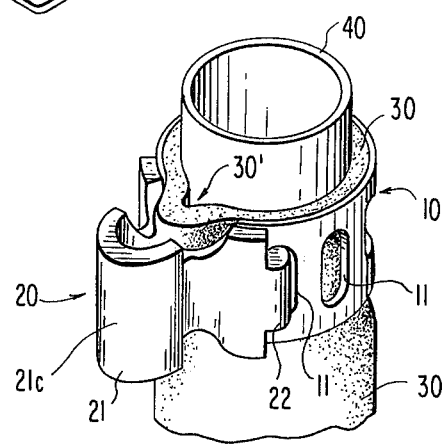
FIG. 3 is a perspective view on a prior art hose clamp utilizing the clamping parts of FIGS. 1 and 2 in connection with a thin plastic hose.

Upon deformation of the ear 21 by the use of pincers engaging within the area of the transition between the circumferential portions 26a and 26b and the outwardly extending portions 21a and 21b of the ear 21, the ear 21 is deformed substantially into omega shape, thereby tightening the band 10 about the hose 30 and thus exerting a clamping action on the hose 30 which clamps the hose 30 onto the nipple 40. However, in case the hose 30 consists of relatively soft rubber or similar material and especially in case the hose 30 consists of thin plastic hose material, it is oftentimes difficult to assure a completely tight sealing action within the area of the ear 21 since, as shown in FIG. 3, a small portion 30' of the hose 30 underneath the ear is displaced approximately V-shaped into the gap underneath the ear 21, thereby leaving a small gap between the inner circumference of the hose portion 30' and the outer circumference of the nipple 40 which leads to leakages.

Figure 4:
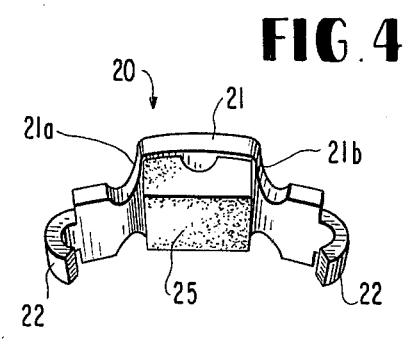
FIG. 4 is a perspective view of a clamping member, similar to FIG. 2, with an elastic insert in accordance with the present invention.
Figure 5:
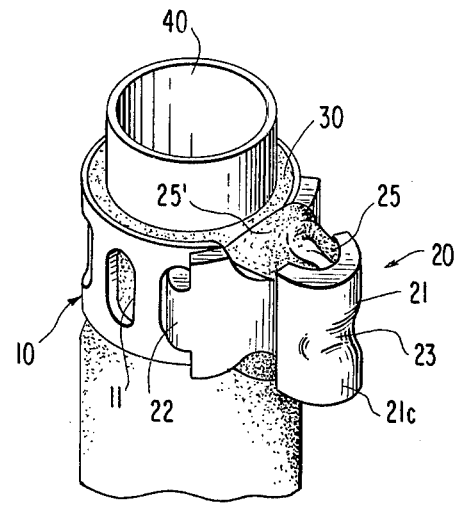
FIG. 5 is a perspective view, similar to FIG. 3, illustrating the clamping action of the clamping member of FIG. 4.

According to the present invention, the clamping member 20 is provided with a rubber insert 25 (FIG. 4) which during deformation of the ear 21 is displaced radially inwardly, thereby filling the narrow gap resulting in the circumferential direction of the band 10 underneath the ear 21 and therewith effectively opposing an outward displacement of the hose 40 into such gap, as shown in FIG. 5. Consequently, the tendency on the part of the hose 30 to be squeezed into the gap as shown in FIG. 3 is effectively counteracted by the presence of the elastic insert 25 of the present invention. To the extent that small amounts of the elastic insert 25 are also displaced axially out of the ear 21 on one or both sides thereof, such displacement has no effect on the present invention and can be removed by conventional means, if so desired for aesthetic reasons. Moreover, by providing pincers with lateral cheeks that cover the axial ends of the ear 21 during closing of the pincers, it is possible to prevent the possibly nonaesthetic projection of the elastic material left and right from the ear 21 during the closing. Conventional manual pincers or pneumatic pincers which have side cheeks mounted on both sides can be used for that purpose. The use of such pincers produces a concentrated pressure of the elastic material present on the inside of the ear in a direction toward the hose to be clamped. However, on the basis of tests, completely tight connections are also obtainable without the use of such special pincers with side cheeks which primarily increase the aesthetic appearance of the clamp.

Figure 8:
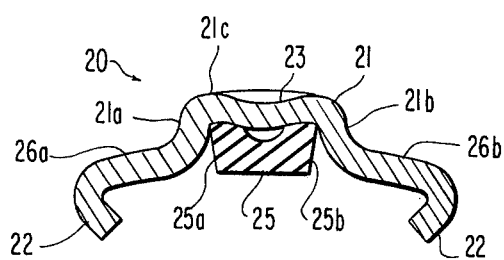
FIG. 8 is a cross-sectional view, taken along line VIII—VIII of FIG. 7 and illustrating a clamping member in accordance with the present invention in cross section.

Furthermore, any excess material protruding axially out of the ear on both sides thereof can also be minimized by a suitable configuration of the elastic insert, as shown in FIG. 8, in which the elastic insert 25 includes inclined end surfaces 25a and 25b.

The material for the elastic insert 25 is suitably chosen so as to be sufficiently flexible for its deformation and displacement during the deformation of the ear, yet is not so resilient as to offer insufficient resistance to the tendency of the outward movement of the hose into the area of the gap. In other words, the size and type of material of the elastic insert is so chosen that the elastic insert material which during deformation and contraction of the ear is displaced radially inward into and through the gap in the band, offers a sufficient resistance to the outward movement of the hose without unduly resisting the deformation of the ear and/or without producing forces seeking to open again the deformed ear to the point where the band would be inadequately contracted which would then result in an insufficient clamping action. Any suitable known elastic material, such as rubber or rubber-like materials, can be used for the present invention including synthetic resinous materials of various types as known to a person skilled in the art.

Furthermore, to oppose any tendency on the part of the ear 21 to open as a result of the presence of the elastic insert 25, a groove 23 extending in the circumferential direction is provided in the web portion 21c of the ear, as disclosed in my prior U.S. Pat. No. 3,475,793. The presence of such groove 23 gains new importance and significance with the use of the elastic insert 25 in a construction according to the present invention since it considerably reduces any tendency on the part of the ear to open as a result of the presence of the elastic insert material inside of the ear. Furthermore, it increases the tolerances as regards type of material and shape of material in the ear without adversely affecting the operation of the clamp for its intended purposes.

Figure 6:
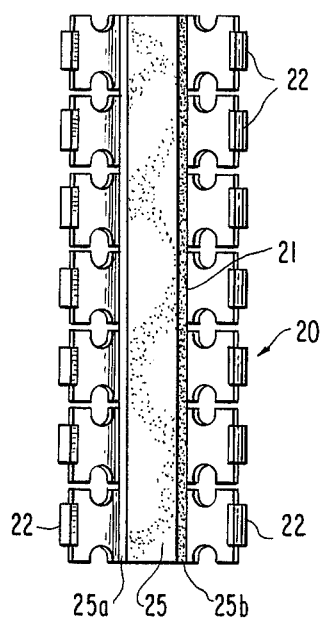
FIG. 6 is a bottom view on a series of interconnected clamping members of the type illustrated in FIG. 4 with the elastic insert in the form of a continuous strip.
Figure 7:
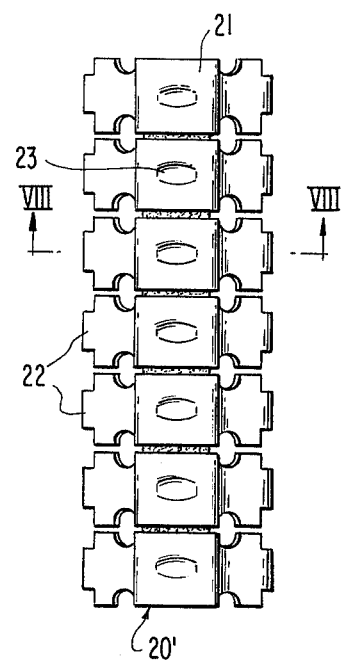
FIG. 7 is a top plan view of the interconnected clamping members of FIG. 6.

FIGS. 6 and 7 illustrate a section of interconnected clamping members 20' of the type shown in FIG. 4, which are provided with circumferential grooves 23 (FIG. 7) and with elastic insert members 25. As can be seen from FIGS. 6 and 7, the clamping members 20 are interconnected along narrow webs where they can be separated readily for individual use. In the course of such separation, the continuous strip of elastic insert 25 suitably fastened in the ears 21 of the thus interconnected clamping members 20, for example, by an appropriate adhesive substance, will also be appropriately severed at the same time. In lieu of a strip of elastic material adhesively fastened in the ears 21 of the thus interconnected clamping members 20, it is also possible to vulcanize the elastic insert 25 in situ into the ears 21 of the thus interconnected clamping members 20, utilizing therefor conventional mass production techniques.

Figure 9:
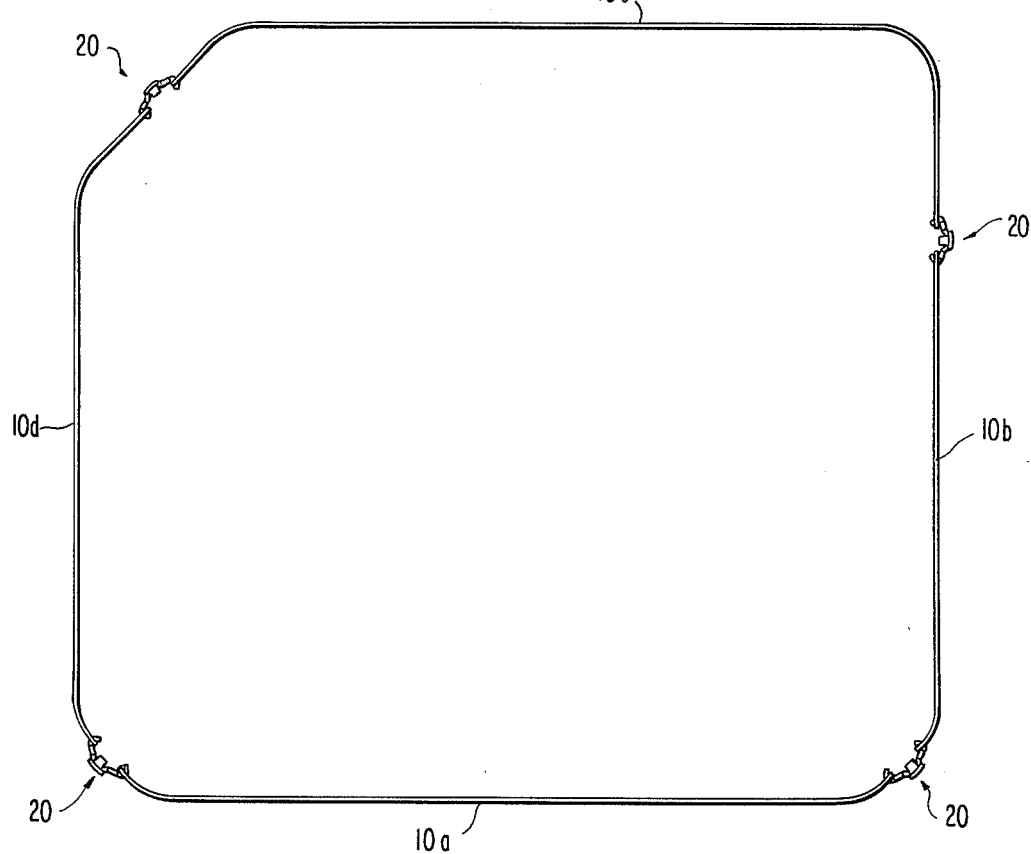
FIG. 9 is an end view of a band clamp of irregular shape utilizing clamping members in accordance with the present invention.

FIG. 9 illustrates the application of the present invention to a hose clamp structure consisting of four band sections 10a, 10b, 10c and 10d, suitably interconnected by four clamping members 20. As can be seen from FIG. 9, the band clamp can be of any irregular shape and of any non-standardized size, which is an important feature of the present invention.

Figure 10:
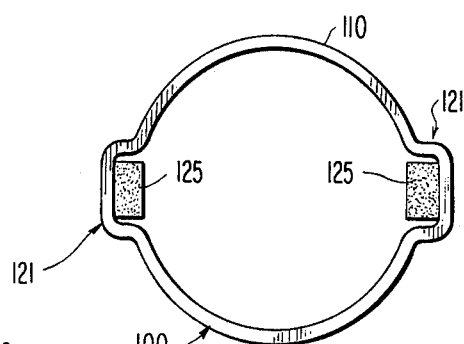
FIG. 10 is an end view of a two-ear clamp with an elastic insert in each ear in accordance with the present invention.
Figure 11:
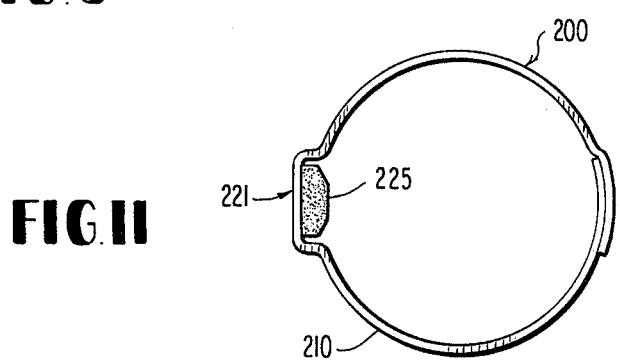
FIG. 11 is an end view of a one-ear clamp with an elastic insert in accordance with the present invention.

FIGS. 10 and 11 illustrate the application of the present invention to a two-ear clamp generally designated by reference numeral 100 and to a one-ear clamp generally designated by reference numeral 200 which are provided, respectively, with elastic inserts 125 and 225 in accordance with the present invention accommodated in the U-shaped ears 121 and 221 interconnecting the band portions 110 and 210.

Tests have demonstrated that the present invention solves the prior art problems by extremely simple means in a highly effective and operationally reliable manner, thereby obviating the need for separate structural parts to be manually inserted prior to the installation of the clamp or the use of special tools which cannot be used in all applications. Since the elastic insert of the present invention is relatively inexpensive with respect to material, manufacture and assembly costs, the present invention fills the long-felt need resulting from the aforementioned problems by extraordinarily simple, inexpensive means.

Though a substantially U-shaped ear is shown, the present invention has equal application to ears with a shape as disclosed in the U.S. Pat. No. Re 26,211. Hence, the term approximately or generally U-shaped ear is used herein to cover all such modifications in the shape of the ear.

While I have shown and described several embodiments in accordance with the present invention, it is understood that the same is not limited thereto but is susceptible to numerous changes and modifications as known to those skilled in the art and I therefore do not wish to be limited to the details shown and described herein but intend to cover all such changes and modifications as are encompassed by the scope of the appended claims.

I claim:

1. A hose clamp for tightening a hose onto a fixed member disposed within said hose, comprising clamping band means provided with a gap in at least one place thereof and means including approximately U-shaped deformable ear means interconnecting said clamping band means, said ear means having leg portions extending generally away from said clamping band means and being operable upon deformation of said ear means by contraction of said leg portions within the area of their connection with the band means to also draw together the clamping band means at said gap and to thereby tighten the hose onto the fixed member, characterized by elastic insert means in said ear means, said elastic insert means being displaceable into the gap of said band means underneath the ear means during deformation of the ear means to effectively counteract outward displacement of the hose into the gap during tightening thereof onto the fixed member and therewith prevent non-tightness within the gap area.

2. A hose clamp according to claim 1, characterized in that the clamping band means and ear means are formed integrally with one another.

3. A hose clamp according to claim 1, characterized in that the elastic insert means is vulcanized into the ear means.

4. A hose clamp according to claim 1, characterized in that the elastic insert means is adhesively secured to the web portion of the approximately U-shaped ear means.

5. A hose clamp according to claim 1, characterized in that the ear means is provided with a generally circumferentially extending groove means in the web portion thereof to reduce any tendency on the part of the deformed ear means to open as a result of the presence of the elastic insert means inside of the ear means.

6. A hose clamp according to claim 1, characterized in that the clamping band means consists of a perforated band, and the ear means is provided on a clamping member with hook like end portions adapted to engage with the perforations of the band.

7. A hose clamp according to claim 6, characterized in that the clamp includes several band sections, the free ends of adjacent band sections being interconnected by clamping members.

8. A hose clamp according to claim 1, characterized in that the elastic insert means is of approximately rectangular configuration at least of approximately complementary shape to the ear means.

9. A hose clamp according to claim 8, characterized in that the elastic insert means has a width in the circumferential direction at least somewhat smaller than the spacing of the outwardly extending legs of the ear means.

10. A hose clamp according to claim 9, characterized in that the elastic insert means is wedge-shaped as viewed in the axial direction of the hose clamp, with the end surfaces thereof converging in the direction toward the axis of the clamp.

11. A hose clamp according to claim 5, characterized in that the clamping band means and ear means are formed integrally with one another.

12. A hose clamp according to claim 11, characterized in that the elastic insert means is vulcanized into the ear means.

13. A hose clamp according to claim 5, characterized in that the clamping band means consists of a perforated band, and the ear means is provided on a clamping member with hook like end portions adapted to engage with the perforations of the band.

14. A hose clamp according to claim 13, characterized in that the elastic insert means is adhesively secured to the web portion of the approximately U-shaped ear means.

15. A hose clamp according to claim 5, characterized in that the elastic insert means is of approximately rectangular configuration at least of approximately complementary shape to the ear means.

16. A hose clamp according to claim 5, characterized in that the elastic insert means is wedge-shaped as viewed in the axial direction of the hose clamp, with the end surfaces thereof converging in the direction toward the axis of the clamp.

17. A hose clamp structure of the type, in which at least one deformable, approximately U-shaped ear having outwardly extending leg portions interconnected by a web portion is operable to contract a circumferential band portion adapted to engage the outer surface of a hose and having a gap within the area of the ear, characterized by an elastic insert in said ear which is operable to be displaced into the gap during deformation of the ear so as to effectively prevent outward displacement of the hose into the gap while the band portion is being contracted about the hose.

18. A hose clamp structure according to claim 17, characterized in that said web portion includes a reinforcing groove extending in the circumferential direction to counteract any tendency of the ear to reopen upon deformation due to the presence of the insert.

19. A hose clamp according to claim 1, characterized in that at least the major part of the elastic insert means is located within the confines of the ear means when said ear means is in the initially non-deformed condition.

20. A hose clamp according to claim 19, characterized in that in the initially non-deformed condition of the ear means, said insert means does not substantially project into the space of a circular configuration of the band means.

21. A hose clamp according to claim 20, characterized in that in the initially non-deformed condition of the ear means, said insert means is fastened only at said ear means.

22. A hose clamp according to claim 21, characterized in that said insert means is fastened only to the web portion of the approximately U-shaped ear means.

23. A hose clamp according to claim 1, characterized in that in the initially non-deformed condition of the ear means, said insert means does not substantially project into the space of a given configuration of the band means.

24. A hose clamp according to claim 1, characterized in that in the initially non-deformed condition of the ear means, said insert means is fastened only at said ear means.

* * * * *